US009535764B2

(12) United States Patent
Dutta et al.

(10) Patent No.: US 9,535,764 B2
(45) Date of Patent: Jan. 3, 2017

(54) RESOURCE ALLOCATION MECHANISM

(75) Inventors: Debojyoti Dutta, Santa Clara, CA (US); Rajendra Shinde, Fremont, CA (US); Subrata Banerjee, Los Altos, CA (US); Ethan Spiegel, Mountain View, CA (US)

(73) Assignee: Cisco Technology, Inc., San Jose, CA (US)

( * ) Notice: Subject to any disclaimer, the term of this patent is extended or adjusted under 35 U.S.C. 154(b) by 1103 days.

(21) Appl. No.: 13/397,426

(22) Filed: Feb. 15, 2012

(65) Prior Publication Data

US 2013/0212279 A1    Aug. 15, 2013

(51) Int. Cl.
*G06F 15/173* (2006.01)
*G06F 9/50* (2006.01)

(52) U.S. Cl.
CPC .......... *G06F 9/5061* (2013.01); *G06F 9/5077* (2013.01)

(58) Field of Classification Search
CPC ................................. H04L 47/70; H04L 67/10
USPC ........................................... 709/226; 70/226
See application file for complete search history.

(56) References Cited

U.S. PATENT DOCUMENTS

2010/0169948 A1* 7/2010 Budko et al. ................... 726/1

OTHER PUBLICATIONS

Ballani et al., "Towards Predictable Datacenter Networks," SIGCOMM '11, Toronto, Ontario, Canada, Aug. 15-19, 2011, 12 pages.
Chowdhury, "Resource Management in Multi-* Clusters: Cloud Provisioning," Apr. 30, 2010, 12 pages.
Lee et al., "Heterogeneity-Aware Resource Allocation and Scheduling in the Cloud," Spring 2010, 5 pages.
Meng et al., "Improving the Scalability of Data Center Networks with Traffic-aware Virtual Machine Placement," IEEE INFOCOM 2010 Proceedings of the 29th Conference on Information Communications, 9 pages.

\* cited by examiner

*Primary Examiner* — Hua Fan
(74) *Attorney, Agent, or Firm* — Parker Ibrahim & Berg LLC; James M. Behmke; Stephen D. LeBarron

(57) ABSTRACT

A first network device determines capabilities of resources in a section of a network that is accessible using the first network device. The first network device groups the resources into a resource cluster. The first network device advertises the resource cluster in the network, wherein each of a plurality of network devices advertise a resource cluster associated with sections of the network. A second network device receives a request for providing a service. The second network device groups the request into a plurality of request clusters. The second network device selects at least one resource cluster for providing the service based on information associated with the request clusters and the advertised resource clusters. The second network device allocates resources included in the at least one resource cluster for providing the service based on selecting the at least one resource cluster.

18 Claims, 4 Drawing Sheets

RESOURCE ALLOCATION MECHANISM

TECHNICAL FIELD

The following disclosure relates generally to mechanisms for resource allocation.

BACKGROUND

Data centers sometimes use external resources for providing services. For example, data center applications may be executed by groups of remote servers in a back-end network providing virtual data center services. It may be useful to place applications of the data centers by mapping to resources in the back-end network.

DESCRIPTION OF EXAMPLE EMBODIMENTS

Overview

Figure 1:
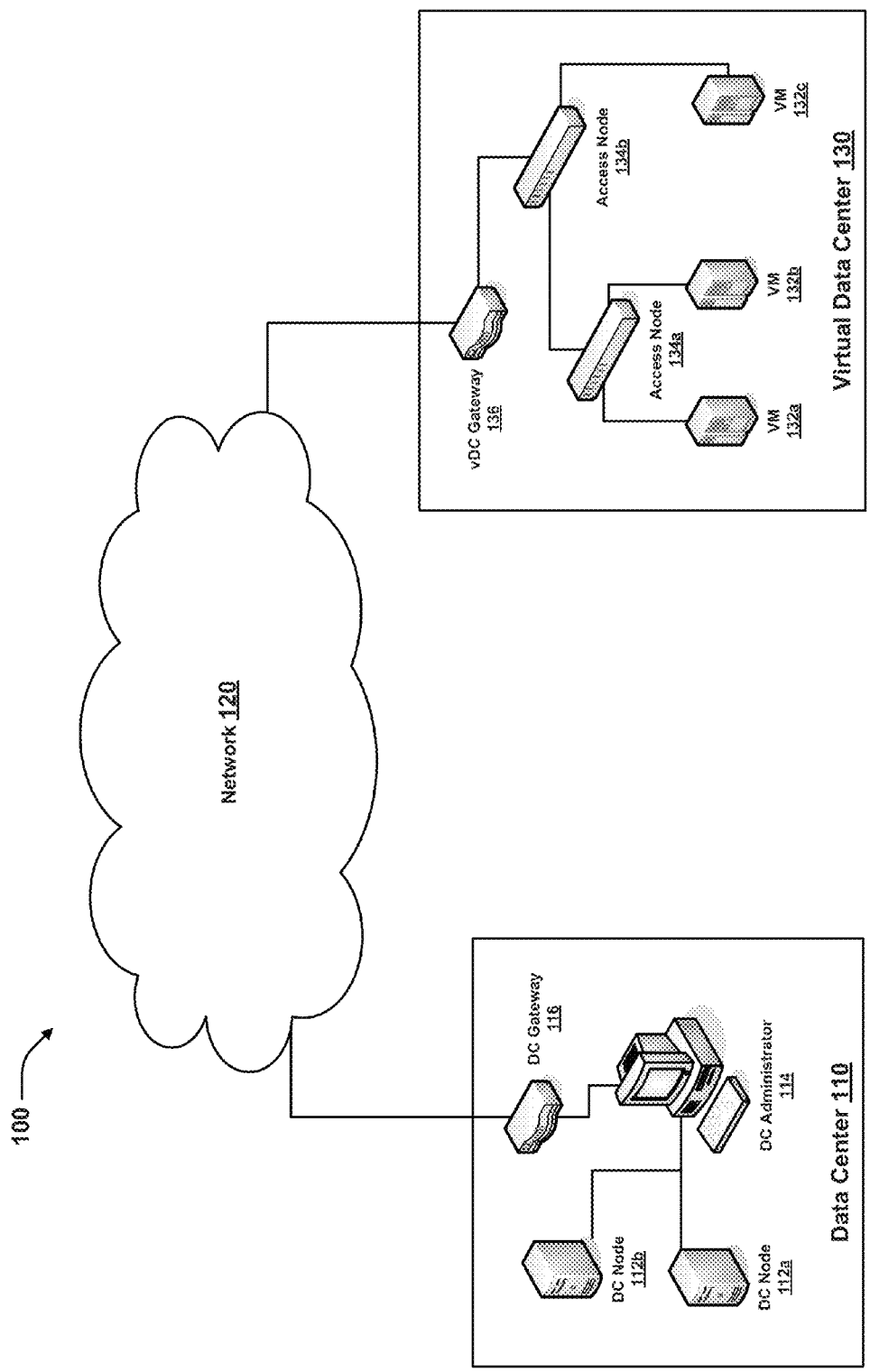
FIG. 1 illustrates an example of a communications system that connects a data center to a virtual data center over a network.

In one configuration, a first network device determines capabilities of resources in a section of a network that is accessible using the first network device. The first network device is one of a plurality of network devices providing access to resources in different sections of the network. The first network device groups the resources into a resource cluster based on determining the capabilities of the resources, a resource cluster being a grouping of one or more resources with similar features. The first network device advertises the resource cluster in the network, wherein each of the plurality of network devices advertise a resource cluster associated with sections of the network that are accessible using each of the plurality of network devices.

In another configuration, a first network device determines capabilities of resources in a network. The first network device groups the resources into a resource cluster based on determining the capabilities of the resources, a resource cluster being a grouping of a plurality of resources with similar features. The first network device receives a request for providing a service, the request including information related to a resource requirement for providing the service. The first network device groups the request into one or more request clusters based on the information related to the resource requirement for providing the service, a request cluster being a grouping of a plurality of components of the service with similar resource requirements. The first network device selects at least one resource cluster for providing the service based on information associated with the resource clusters and the request clusters. The first network device allocates resources included in the at least one resource cluster for providing the service based on selecting the at least one resource cluster for providing the service.

In another configuration, a first network device determines capabilities of resources in a network. The first network device receives a request for providing a service, the request including information related to a resource requirement for providing the service. The first network device groups the resources into a plurality of resource clusters based on the determined capabilities of the resources and the information related to a resource requirement for providing the service, a resource cluster being a grouping of a plurality of resources with similar features. The first network device selects at least one resource cluster for providing the service based on information associated with the plurality of resource clusters and information associated with the request. The first network device allocates resources included in the at least one resource cluster for providing the service based on selecting the at least one resource cluster for providing the service.

DETAILED DESCRIPTION OF EXAMPLE EMBODIMENTS

Recent trends in networking technologies include the drive towards infrastructure as a service (IAAS), in which users' data are processed by applications in the "cloud," i.e., clusters of servers and other resources hosted at remote locations and connected to the users' machines over wired and wireless networks, e.g., the Internet. For example, organizations utilize data centers for processing large amounts of data associated with the organizations' activities.

The data center operations for many organizations are provided by server farms managed by network service providers and other entities that provide IAAS. An organization's data center applications may be mapped to resources in the server farms over public and private networks using virtual private networking (VPN) connections, the server farm resources thereby providing a "virtual data center" (vDC) for the organization's data center (DC). In this context, a resource may be a computer, a server, a virtual machine (VM) running on a computer or a server, or any other suitable processing device or appropriate combination thereof, that is configured to provide services to a data center. The resource receives a request from the data center to perform an operation associated with the request. Based on instructions included with the request, the resource performs the operation and sends the results, which may include processed data, back to the data center.

The resources of a virtual data center are usually shared by more than one organization, depending on contractual policies and temporal demands, among other conditions. When there is data to be processed by an organization's data center, the data center sends requests for resources to process the data to a vDC to which the data center is connected. A service provider providing the vDC may get resource requests from multiple organizational data centers at the same time. A key challenge faced by the service providers is how to allocate the resources of the virtual data center to the various requests for resources, such that the disparate requirements of the requests different are satisfied, consistent with various constraints, such as policy constraints and node and path constraints, that may be in place for the requests and the virtual data center. In addition, the allocation should be done in a manner that is completely transparent to the data centers making the requests. The policy constraints include, among other conditions, minimum or maximum utilization of network links, and maximum power consumed by the resources (e.g., servers on a rack in the virtual data center). The node constraints include available computing, load balancing and storage capabilities of the resources in the virtual data center. The path constraints include maximum bandwidth, delay and hop count of network links connecting the resources in the virtual data center.

The service provider uses various algorithms to determine an allocation of the resources for the different requests. In many situations, arriving at an optimal allocation may be infeasible; in such circumstances, a near-optimal or sufficiently good allocation based on heuristics is adopted.

FIG. 1 illustrates an example of a communications system 100 that connects a data center (DC) to a virtual data center (vDC) over a network. Communications system 100 includes a data center 110 that is connected over a network 120 to a virtual data center 130. The data center 110 includes computers or servers DC node 112a and DC node 112b. The data center 110 also includes an administrator device DC administrator 114 and a gateway device DC gateway 116. The virtual data center 130 includes resources such as VM 132a, VM 132b and VM 132c. In addition, the virtual data center 130 includes routers and/or switches access nodes 134a and 134b, and a gateway device vDC gateway 136.

The data center 110 may be a collection of interconnected network devices that belong to an organization and configured for processing data associated with the organization's activities. The data processing for the data center 110 is distributed between the computers DC node 112a and DC node 112b. While FIG. 1 shows only two computers for processing data in the data center 110, the data center 110 may include any number of computers for performing operations in the data center. The computers DC node 112a and DC node 112b may be in the same location or they may distributed in multiple locations, with the computers being connected through one or more networks, e.g., an organization-wide intranet. DC node 112a and DC node 112b may be servers and the data center 110 may include one or more servers, e.g., a server farm, or another server arrangement including one or more processors configured to execute instructions stored by a computer-readable medium for performing various server operations.

The data center 110 includes an administrator device DC administrator 114 that may be implemented by a computer, a server, a collection of computers or a collection of servers that together provide the functionality of the administrator device. In some implementations, the DC administrator 114 may include a display. The DC administrator 114 is used by an administrator of the data center 110 for managing the data center 110. For example, the DC administrator 114 may be used to configure the computers DC node 112a and DC node 112b; monitor the work load of the computers DC node 112a and DC node and accordingly distribute incoming data center jobs to a computer that has more idle processing cycles available; and monitor the performance of the data center 110 to detect and identify faults or error conditions and to troubleshoot the faults or error conditions.

The data center 110 includes a gateway device DC gateway 116. The DC gateway 116 is a border router or switch that acts as a point of entry/exit for data that is exchanged between the data center 110 and external networks e.g., network 120 or virtual data center 130. The DC gateway 116 is configured to process all communications with entities outside the data center 110. The DC gateway 116 may run a gateway routing protocol to connect the data center 110 to external networks. The DC gateway 116 also may run security applications, e.g., a firewall, to inspect the data that is exchanged with the external networks for viruses or other security issues, and protect the devices and data within the virtual data center 110 from attacks by external entities.

The network 120 connects the data center 110 to the virtual data center 130. The network 120 may belong to a network service provider, e.g., an Internet Service Provider (ISP), and it may be configured to provide back-haul services to the data center 110. The network 120 may include a circuit-switched data network, a packet-switched data network, or any other network able to carry data, for example, Internet Protocol (IP)-based or asynchronous transfer mode (ATM)-based networks, including wired or wireless networks. The network 120 may be configured to handle web traffic such as HyperText Transfer Protocol (HTTP) traffic and hypertext markup language (HTML) traffic. The network 120 may include the Internet, Wide Area Networks (WANs), Local Area Networks (LANs), analog or digital wired and wireless networks (e.g., IEEE 802.11 networks, Public Switched Telephone Network (PSTN), Integrated Services Digital Network (ISDN), and Digital Subscriber Line (xDSL)), Third Generation (3G) or Fourth Generation (4G) mobile telecommunications networks, a wired Ethernet network, a private network such as an intranet, radio, television, cable, satellite, and/or any other delivery or tunneling mechanism for carrying data, or any appropriate combination of such networks.

The virtual data center 130 includes a collection of interconnected network devices hosted and maintained by a service provider and configured to provide data processing functionality to one or more organizations. The data processing by the virtual data center 130 is distributed between one or more of VM 132 a, VM 132 b and VM 132 c. VM 132 a, VM 132 b and VM 132 c may be configured to provide virtual machine services to data centers. One computer or server may run multiple virtual machines, with the different virtual machines processing data for different data centers, or processing different applications for the same data center. Each of VM 132 a, VM 132 b and VM 132 c represents one or more virtual machines running on the respective host computer or server, along with the host computer or server. For example, VM 132 a represents a host computer or server and one or more virtual machines that are running on the host computer or server. While FIG. 1 shows only three resources VM 132 a, VM 132 b and VM 132 c, the virtual data center 130 may include any number of resources for data processing activities. For example, the virtual data center 130 may include a server farm, or another server arrangement including one or more processors configured to execute instructions stored by a computer-readable medium for performing various server operations.

VM 132a, VM 132b and VM 132c may be in the same location, e.g., they may be on servers that are on a same rack. Alternatively, VM 132a, VM 132b and VM 132c may distributed in multiple locations (e.g., placed on different racks), being connected through one or more networks, e.g., an intranet.

In one implementation, the service provider providing the virtual data center 130 and the network service provider providing the network 120 may be the same entity that provides external network connectivity and data processing services to organizations, e.g., the organization with the data center 110. However, in another implementation, the service provider providing the virtual data center 130 and the network service provider are distinct entities.

VM 132a, VM 132b and VM 132c are connected by access node 134a and access node 134b. In this context, an access node is a router, a switch, or any combination thereof that interconnects resources in different sections of the data center with other resources, access nodes and gateway devices. The virtual data center 130 may include one or more such access nodes. An access node connects a set of resources that are directly connected to it with other sections of the network. For example, access node 134a connects VM 132a and VM 132b to each other and to a section of the virtual data center network 130 that includes access node 134b and VM 132c. Access node 134a may be, for example, a switch or router that is placed on a rack that includes VM 132a and VM 132a

The access nodes in the virtual data center 130 may be connected in a hierarchy. In some implementations, the hierarchy may be a logical hierarchy in which access nodes that are directly connected to data processing computers, e.g., VM 132a, VM 132b, or VM 132c, are at a lower "level" in the hierarchy compared to access nodes that interconnect other access nodes and/or other devices (e.g., the vDC gateway 136) in the virtual data center. For example, access node 134a is directly connected to VM 132a and VM 132b. Access node 134b is directly connected to computer VM3132c, but it also interconnects access node 134a and the vDC gateway 136. Therefore, access node 134b is at a higher level in the hierarchy compared to access node 134a. Incoming data for the virtual data center 130 is first processed by access node 134b before being forwarded to access node 134a. Outgoing data from VM 132a and VM 132b are routed by access node 134a to access node 134b for forwarding to external networks through the vDC gateway 136. In other implementations, the hierarchy may be a physical hierarchy.

Access nodes 134a and 134b are configured to distribute incoming data processing operations or jobs to one or more of VM 132a, VM 132b and VM 132c. In some implementations, each of the access nodes 134a and 134b may be configured to monitor the workload on each computer that it is directly connected to, and based on monitoring the workload, independently determine how to distribute incoming jobs. For example, access node 134a may monitor the data processing being performed by virtual machines VMs 132a and 132b, and access node 134b may monitor the data processing performed by virtual machines running on VM 132c. Based on the monitoring, access node 134a may determine how to distribute incoming jobs to VMs 132a and 132b.

However, in other implementations, each of the access nodes 134a and 134b may be configured to monitor the workload on computers that it is directly connected to, and report the workload and/or advertise available processing cycles to higher-level access nodes to which they are directly connected. Based on the reports or advertisements received from lower-level access nodes, a higher-level access node may determine how to distribute incoming jobs to computers connected to the lower-level access nodes. For example, access node 134a may send advertisements to access node 134b. Based on the reports/advertisements received from access node 134a, and the monitoring of VM 132c, access node 134b may determine how to distribute incoming jobs among VMs 132a, 132b and 132c. Consequently, access node 134b may forward a percentage of the incoming jobs to access node 134a, for distributing between VMs 132a and 132b. Access node 134b may distribute the remaining percentage of the incoming jobs among virtual machines running on VM 132c.

In some implementations, all advertisements may be sent to a top-level access node that acts as a controller node for the entire virtual data center 130. The top-level access node that acts as the controller node may be an access node that shares a link or connection with the gateway device such that all incoming job requests are received by the access node.

The top-level access node may be connected to the resources in the virtual data center through one or more other access nodes that share links with the resources. In some implementations, there may be several levels of intermediate access nodes between a top-level access node and the resources in the virtual data center, thereby forming a logical hierarchy as described previously, with the top-level access node or controller node being at the highest level in the hierarchy, the resources and the access nodes directly connected to the resources being at the lowest level in the hierarchy, and the intermediate access nodes being in the middle levels of the hierarchy.

The controller node may determine the distribution of incoming jobs among resources connected to various access nodes, and accordingly forward percentages of the incoming jobs to the different access nodes. An access node receiving its share of the incoming jobs from the controller may distribute the share of jobs among the resources directly connected to it based on instructions received from the controller. Alternatively, the controller may determine the distribution of incoming jobs among various access nodes directly connected to the controller, and accordingly forward percentages of the incoming jobs to the different access nodes. An access node receiving its share of the incoming jobs from the controller may determine how to distribute the share among resources directly connected to the access node, and accordingly distribute the share of jobs among the resources.

The vDC gateway 136 connects the virtual data center 130 to external networks and acts as a point of entry/exit for data that is exchanged between the data center 113 and the external networks. The vDC gateway 136 may be a border router or switch that runs a gateway routing protocol to connect the data center 130 to external networks. The vDC gateway 136 also may run security applications, e.g., a firewall, to inspect the data that is exchanged with the external networks for viruses or other security issues, and protect the devices and data within the virtual data center 130 from attacks from external entities.

As described previously, the data center 110 processes data for an organization that owns and/or manages the data center 110. The data processing by the data center 110 is administered from the DC administrator 114. The DC administrator 114 may allocate the data to be processed to DC nodes 112a and 112b. Alternatively, the DC administrator 114 may send a percentage of the data to be processed to the virtual data center 130 for processing by the resources of the virtual data center 130. In some implementations, the DC administrator 114 may send all the data to be processed to the virtual data center 130. There may exist an arrangement between the data center 110 and the virtual data center 130 based on which the DC administrator 114 sends the data to the virtual data center 130 for processing, e.g., a contract between the organization owning the data center 110 and the service provider providing the virtual data center 130.

The data center 110 sends requests to the virtual data center. The requests may include information such as information on one or more resources that are requested by the data center for processing of the data associated with the data center. The instructions may include constraints on how to process the data, e.g., a time within which to process the data and return results to the data center 110. The requests are sent via the DC gateway 116 and over the network 120, and are received at the virtual data center 130 by the vDC gateway 136. The DC gateway 116 may use an existing connection between the DC gateway 116 and the vDC gateway 136 to send the data, or it may create a new connection between the DC gateway 116 and the vDC gateway 136, for every time the data center 110 has requests to send. The connection between the DC gateway 116 and the vDC gateway 136 may be a secure connection, e.g., a virtual private network (VPN) connection, or it may be an unsecured connection, e.g., an open File Transfer Protocol (FTP) connection or an HTTP connection.

The vDC gateway 136 may forward the requests received by it to a top-level access node, e.g., access node 134b, which is configured to act as a controller and distribute the requests to lower-level access nodes. The controller receives, from lower-level access nodes, advertisements announcing available processing capability for resources, i.e., servers or virtual machines running on the servers, which are connected to the lower-level access nodes. In some implementations, a lower-level access node may consider the resources that are connected to the lower-level access node as a group, and advertise to the higher-level the capabilities of the group.

Based on the advertisements of the available capabilities of different groups, the controller may distribute the requests among the groups and forward shares of the requests to the respective lower-level access nodes. A lower-level access node distributes the share of requests intended for its advertised group among the resources that comprise its group. A resource processes the data it receives and sends results based on the processing to the access node that is connected to the resource. The access node forwards the processed data received from the resource to the controller, which in turn forwards the processed data to the data center 110 through the vDC gateway 136, and over the network 120. In some implementations, an access node may aggregate the processed data received from all resources connected to the access node forming a group, and forward the aggregate processed data for the group to the controller. The controller may aggregate the processed data received from all groups, and subsequently send the overall processed data to the data center 110.

In some implementations, the network in the virtual data center may be grouped into a hierarchy of clusters. For example, the service provider may map the network topology in the virtual data center 130 to a tree topology, with routers and switches at intermediate nodes of the tree and the servers performing the tasks associated with requests being at the leaf nodes of the tree. The resources in different branches of the tree are aggregated into a hierarchy of clusters or groups, with the resources available in each cluster being advertised to higher-level resource clusters. Clusters are allocated for performing the requests based on the cluster advertisements. The allocation of clusters is done while satisfying constraints on computing capabilities and bandwidth at the granularity of a cluster. This approach ensures that requests are satisfied while reducing the complexity of the resource allocation. The clustering also provides a quasi-realtime snapshot of the resource availability in the virtual data center, and aids the process of resource allocation.

Figure 2:
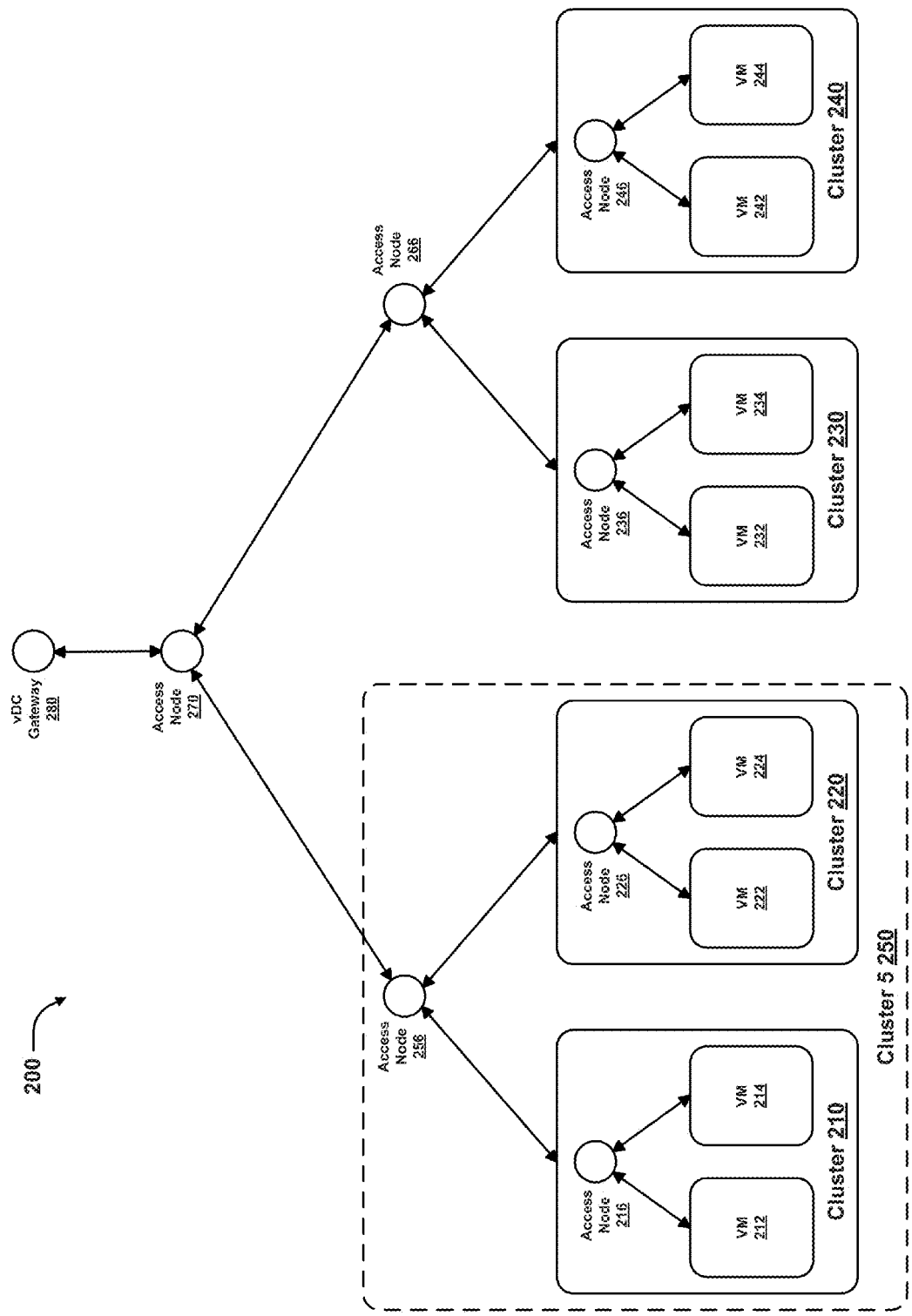
FIG. 2 illustrates an example of a system for grouping resources in a virtual data center.

FIG. 2 illustrates an example of a system 200 for grouping resources in a virtual data center. The following describes the system 200 as being implemented by the virtual data center 130 that is part of the system 100. However, the system 200 may be implemented by other systems or system configurations.

The system 200 includes resources VM 212, VM 214, VM 222, VM 224, VM 232, VM 234, VM 242, VM 244 that are grouped into clusters 210, 220, 230 and 240. The system 200 includes the access nodes 216, 226, 236, 246, 256, 266 and 270. In addition, system 200 includes a vDC gateway 280. In some implementations, cluster 210 and cluster 220 may be grouped into cluster 250.

VM 212, VM 214, VM 222, VM 224, VM 232, VM 234, VM 242, and VM 244 may be computers, servers, virtual machines running on computers or servers, or any other suitable processing devices or appropriate combinations thereof that are capable of providing requested services to a data center. VM 212, VM 214, VM 222, VM 224, VM 232, VM 234, VM 242, and VM 244 may be similar to the resources VM 132a, VM 132b and VM 132c of the virtual data center 130 in system 100.

Cluster 210 includes VM 212 and VM 214, and also includes access node 216. In this context, a cluster is a grouping or "clustering" of resources that is based on some predetermined metric or clustering algorithm. For example, resources that share a similar feature may be grouped into a cluster. The similar feature may be a common physical location, e.g., servers on a same rack, two or more racks of servers that are connected by a switch (e.g., a pod) which may be grouped into a cluster. As another example, resources with similar configuration, e.g., two servers with identical CPU speeds may be grouped together into a cluster. In this case, the resources may not be present at the same location, but they are considered as a cluster for the purposes of determining how to distribute requests. A cluster that includes one or more resources is referred to as a "resource cluster." Clusters 210, 220, 230, 240 and 250 are examples of resource clusters.

In some implementations, a resource cluster includes at least one access node, e.g., cluster 210 including access node 216. The access node included in a resource cluster may be a router or a switch that is directly connected to the resources included in the resource cluster. For example, the access node 216 is directly connected to VM 212 and VM 214 in cluster 210. However, in some other implementations, a resource cluster may include resources and access nodes such as routers or switches may be outside of the resource cluster.

In some implementations, the network devices and resources in system 200 may be arranged in a hierarchy, for example similar to the hierarchy in system 100. The hierarchy may be a logical hierarchy in which resources inside a cluster may be arranged in a hierarchy based on the activities performed by the resources, and the clusters also may be arranged in a hierarchy. A resource cluster may have a cluster representative at the top level of the hierarchy in the resource cluster. The cluster representative is configured to manage the resource cluster and communicate with entities outside the resource cluster on behalf of devices within the resource cluster. In some implementations, the cluster representative may be an access node that is included in the resource cluster. For example, access node 216 may be the cluster representative of cluster 210. In some other implementation, the cluster representative may be a resource included in the resource cluster. For example, VM 212 may be the cluster representative of cluster 210. In yet other implementations, the access node may be considered as a resource and therefore the cluster representative may be both a resource and an access node. For example, access node 134b may be configured to run virtual machines for data processing, apart from forwarding data for VM 132a, VM 132b and VM 132c.

A cluster representative polls the resources in its resource cluster and determines the configuration, workload and processing capabilities of the resources within the resource cluster. In addition, the cluster representative may determine the available bandwidth of network links that connect the resources within the resource cluster. The cluster representative advertises one or more available capabilities of its resource cluster to entities outside the resource cluster. The one or more advertised capabilities may include aggregate available processing capability of the resources within the resource cluster, available network bandwidth within the resource cluster, or any other suitable parameter or appropriate combination thereof.

In the hierarchical arrangement of the system 200, the cluster representative of a cluster advertises the parameters to an access node or any other suitable network device that is present at a higher level in the hierarchy. The hierarchy may be a 3-level hierarchy, with an access node that shares a connection with the gateway being at the highest level in the hierarchy. The highest level access node in the hierarchy may act as a controller node for the system. Access nodes that connect the highest level access node to the clusters are at one level below the highest level, and the access nodes sharing connections with the resources being at the lowest level of the hierarchy. For example, access node 270 may be at the highest level in the hierarchy and may be configured as the controller for the system 200. One level below in the hierarchy are access nodes 256 and 266. At the lowest level in the hierarchy are access nodes 216, 226, 236 and 246, and their associated resources in the respective resource clusters.

Such a 3-level hierarchy facilitates streamlined advertisement of resource availability, and corresponding resource allocation without causing a high overhead. An access node at one level in the hierarchy advertises the resources that are available to it, to the access node at the next higher level in the hierarchy with which the lower level access node shares a link. The higher level access node similarly collects the resource advertisements from all lower level access nodes with which it shares links, and advertises the aggregate resource availability to the access node at the next higher level with which it shares a link. In the 3-level hierarchy described previously, the cluster representative for cluster 210 (e.g., access node 216) advertises available processing capability and/or available network bandwidth for cluster 210 to access node 256. Similarly, the cluster representative for cluster 220 (e.g., access node 226) advertises available processing capability and/or available network bandwidth for cluster 220 to access node 256. Access node 266, which is connected to cluster 230 and cluster 240, receives advertisements from the cluster representatives of cluster 230 and cluster 240.

In some implementations, the system 200 may include a hierarchy of resource clusters in which lower-level resource clusters are grouped into higher-level resource clusters such that the cluster representative of a higher-level resource cluster advertises the aggregate parameters of its lower-level resource clusters to the next higher-level. For example, mid-level access node 256 may group clusters 210 and 220 that are connected to it, into cluster 250. Similarly, access node 266 may group clusters 230 and 240 that are connected to it, into a cluster (not shown). Access node 256 receives the advertisements from clusters 210 and 220, which may include available processing capability and available network bandwidth of clusters 210 and 220, respectively. Access node 256 combines the available processing capability of clusters 210 and 220 to generate the available processing capability of cluster 250. Access node 256 combines the available network bandwidth of clusters 210 and 220 to generate the available network bandwidth of cluster 250. Subsequently, access node 256 advertises to its higher-level device, e.g., access node 270, the available processing capability and available network bandwidth of cluster 250. Similarly, access node 266 may advertise to its higher-level node, e.g., access node 270, the available processing capability and available network bandwidth of cluster 260 (not shown). However, in some alternative implementations, the system 200 may include a flat structure of clusters, i.e., it may include only one level of clusters (e.g., clusters 210, 220, 230 and 240) which are not grouped into higher-level resource clusters (e.g., cluster 250 is not present).

In some implementations in which the system 200 includes a hierarchy of resource clusters, the top-level access node in the hierarchy receives service requests including data to be processed from one or more data centers that are being serviced by the virtual data center implementing system 200. For example, access node 270 is the highest level access node in the system 200. It receives from the vDC gateway 280 (which may be similar to the vDC gateway 136), service requests that are sent from one or more data centers and received by the vDC gateway 280 as the point of entry for the virtual data center implementing system 200. The access node 270 also receives resource advertisements from the cluster representatives of one or more higher level resource clusters that are present in the system 200 (e.g., clusters 250 and 260 (not shown)).

In one implementation, the access node 270 examines the service requests and the resource advertisements, and maps the service requests to the higher-level resource clusters based on a predetermined resource allocation mechanism or resource allocation algorithm. The access node 270 then distributes the service requests to the cluster representatives of the higher-level resource clusters based on the resource mapping. For example, cluster node 270 forwards a percentage of service requests to access node 256 that is the cluster representative of cluster 250, and forwards the remaining service requests to access node 266 that is the cluster representative of cluster 260 (not shown). The cluster representative of a higher-level resource cluster that receives service requests from the top-level access node in turn maps the service requests to its lower-level resource clusters based on the predetermined resource allocation mechanism. The cluster representative of a higher-level resource cluster then distributes its received share of service requests to the cluster representatives of the lower-level resource clusters based on the resource mapping. For example, access node 256 maps the percentage of service requests it receives from access node 270, to clusters 210 and 220, based on the advertisements received from cluster representatives of the clusters 210 and 220 (e.g., access nodes 216 and 226, respectively). Access node 256 distributes its percentage of service requests to the cluster representatives of clusters 210 and 220 based on the mapping. Similarly, access node 266 distributes the remaining percentage of service requests that it received from access node 270, to the cluster representatives of its lower-level resource clusters 230 and 240 based on its mapping of the remaining percentage of service requests to clusters 230 and 240.

The cluster representative of a lower-level resource cluster receives a share of service requests from its higher-level access node and distributes the service requests to the resources within its resource cluster, based on its knowledge of the available processing capability, available network bandwidth, or any other suitable parameter or appropriate combination thereof, of the resources within the resource cluster. For example, access node 216 distributes the service requests it receives from access node 256, to VMs 212 and 214 that are within its resource cluster 210, based on its knowledge of the workload, available processing capability, link bandwidth, or any other suitable parameter or any appropriate combination thereof, of the VMs 212 and 214. Similarly, access node 226 distributes the service requests it receives from access node 256, to VMs 222 and 224 that are within its resource cluster 220.

In another implementation, the access node 270 examines the service requests and the resource advertisements, and maps the service requests to the resources within the resource clusters based on a predetermined resource allocation mechanism or resource allocation algorithm. The access node 270 then distributes the service requests to the cluster representatives of the higher-level resource clusters based on the resource mapping, for forwarding to the resources. The cluster representative of a higher-level resource cluster that receives service requests from the top-level access node distributes its received share of service requests to the cluster representatives of the lower-level resource clusters based on the instructions received from the access node 270. For example, access node 256 distributes its percentage of service requests to the cluster representatives of clusters 210 and 220 based on instructions received from access node 270. The cluster representative of a lower-level resource cluster that receives a share of service requests from its higher-level access node, distributes the service requests to the actual resources within its resource cluster, based on instructions from the access node 270 that are forwarded by the cluster representative of the higher-level cluster. For example, access node 216 distributes the service requests it receives from access node 256, to VMs 212 and 214 that are within its resource cluster 210, based on the instructions that are forwarded by access node 256.

Figure 3:
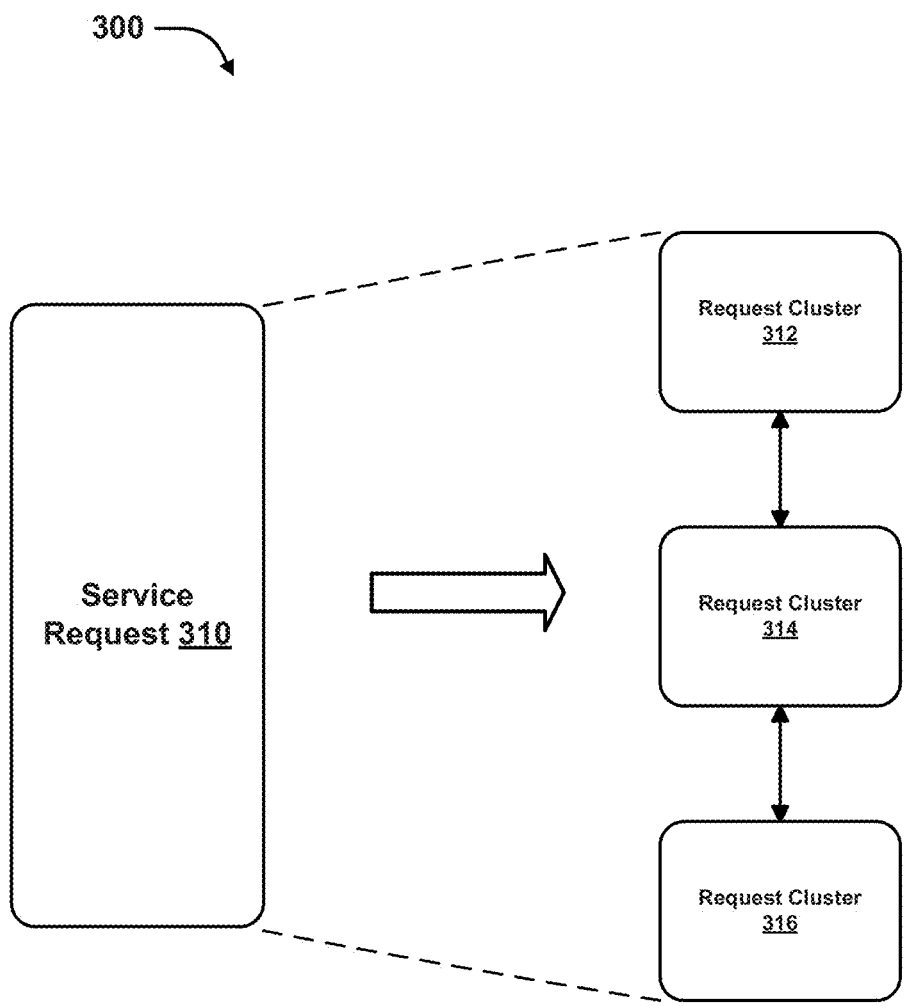
FIG. 3 illustrates an example grouping of resource requests included in a service request.

FIG. 3 illustrates an example grouping 300 of resource requests included in a service request. The grouping 300 may be performed by a top-level access node or controller in a virtual data center that is configured to map service requests to resource clusters using a resource allocation mechanism or algorithm, based on received advertisements from the resource clusters. The following describes the grouping 300 as being implemented by the access node 270 in system 200. However, the grouping 300 may be implemented by other systems or system configurations.

The grouping 300 includes a service request 310 that is grouped into request clusters 312, 314 and 316. The service request 310 may be a service request that is sent by a data center (e.g., the data center 110) and received at a virtual data center (e.g., the virtual data center 130). The service request 310 may include information on one or more resources that are requested by the data center for processing of data associated with the data center. The instructions may include constraints on how to process the data, e.g., a time within which to process the data and return results to the data center that generated the service request.

The service request 310 is received at the virtual data center by a gateway router or switch (e.g., the vDC gateway 280). The gateway router or switch forwards the service request to the controller or top-level access node in the cluster hierarchy implemented in the virtual data center (e.g., access node 270). Based on the information associated with the service request 310, the controller groups the resource requests included in the service request 310 into one or more clusters, e.g., request clusters 312, 314 and 316. The request clusters may be linked to one another based on the aggregate bandwidth of the connection between them.

A request cluster may be a grouping of resources that share some similar features and/or together perform one or more operations, e.g., a virtual machine. For example, a request cluster may be for performing web services, another request cluster may be for executing standalone applications, while a third request cluster may be for performing database functions. In addition, a request cluster is generated such that the request cluster may be mapped to at least one resource in the virtual data center.

After the service request 310 is grouped into request clusters 312, 314 and 316, the controller maps the request clusters to resource clusters using a predetermined resource allocation mechanism or algorithm, based on advertisements from the resource clusters announcing their available capabilities. Once the mapping is completed, the controller forwards the request clusters to the respective cluster representatives of the allocated resources clusters for execution of the service requests.

Figure 4:
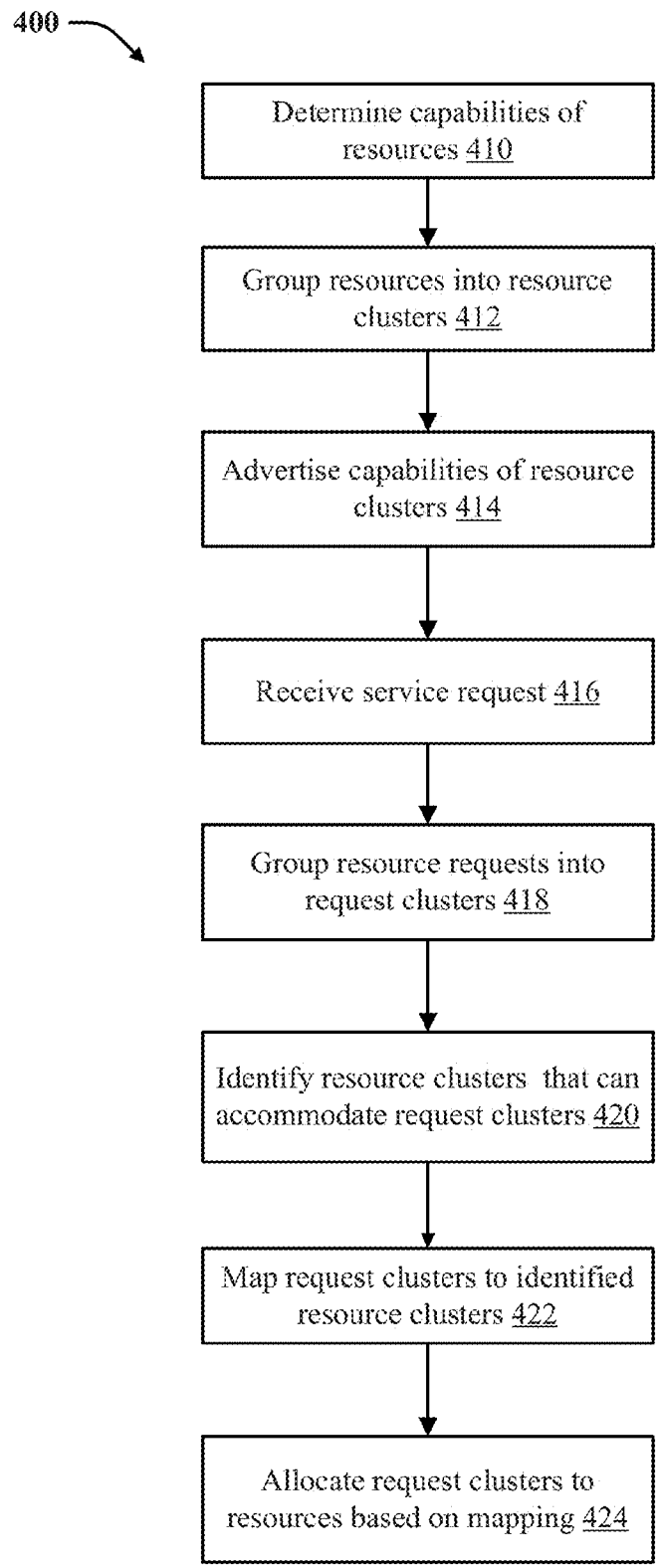
FIG. 4 is a flow chart illustrating an example of a process for clustering and resource allocation for performing a service.

FIG. 4 is a flow chart illustrating an example of a process 400 for clustering and resource allocation for performing a service. The following describes the process 400 as being performed by components of the system 200. However, the process 400 may be performed by other systems or system configurations.

The process 400 may be performed in a virtual data center that includes one or more resources (e.g., computers, servers, virtual machines running on computers or servers, switches, routers, other suitable processing devices or any appropriate combination thereof) for providing services to one or more data centers. For example, the process 400 may be performed by a virtual data center that implements the system 200 (e.g., virtual data center 130).

An access nodes that perform the process 400 (e.g., access node 216, 226, 236 or 246) determines the capabilities of the resources in the virtual data center (410). For example, an access node polls the resources that are directly connected to the access node to determine the capabilities of the resources, e.g., a switch on a rack polls the servers on the rack that are connected to it. The access node may also determine the workload of the resources that are polled. The determined capabilities may include available processing capability, available storage, available load balancing capability, or any appropriate combination thereof. In addition, the access node determines the configuration of the communications links connecting the resources to the access node, and also the configuration of the links connecting the access node to higher-level access nodes (e.g., the controller node). The link configuration includes available bandwidth, committed information rate (CIR) (i.e., minimum guaranteed bandwidth for a process), delay, hop count, or any appropriate combination thereof.

The access node groups the resources into resource clusters (412). In some implementations, an access node groups the resources that are directly connected to the access node into a resource cluster along with the access node itself. For example, a switch on a rack may create a resource cluster that includes the servers on the rack connected to the switch, and the switch itself. In some other implementations, an access node creates a resource cluster that includes the resources that are directly connected to it. In yet other implementations, an access node creates a resource cluster with only a subset of the resources that are connected to it. The resources are selected based on satisfying some requirements, e.g., each computing resource has a minimum required available processing capability, or the selected resources have similar processing capability, or some other appropriate parameter. The access node acts as the cluster representative for the resource cluster.

Upon grouping the resources into a resource cluster, the access node computes the aggregate capabilities of the resources in the resource cluster. For example, access node 216 groups VMs 212 and 214 into resource cluster 210 and computes the aggregate processing capability and aggregate storage capability of the VMs 212 and 214 by combining the individual processing and storage capabilities of the VMs 212 and 214, respectively. An access node advertises the aggregate capabilities of its resource cluster (414) to other nodes in the virtual data center, e.g., to a higher-level node that is connected to the access node in the virtual data center hierarchy. For example, access node 216, acting as cluster representative of cluster 210, advertises the aggregate capabilities of the cluster 210 to access node 256. Similarly, access node 226, which is cluster representative of cluster 220, advertises the aggregate capabilities of the cluster 220 to access node 256, while access nodes 236 and 246 advertise the aggregate capabilities of clusters 230 and 240, respectively, to access node 266.

In some implementations where a hierarchy of resource clusters is implemented, higher level access nodes in turn group lower level resource-clusters into higher-level resource clusters, with the higher level access nodes acting as cluster representatives of the respective clusters. For example, mid-level access node 256 may group clusters 210 and 220 that are connected to it, into resource cluster 250. Access node 256 may act as the cluster representative of resource cluster 250 and compute the aggregate capabilities of the resource cluster 250. Access node 256 determines the capabilities of clusters 210 and 220 from the cluster advertisements that it receives from the cluster representatives (e.g., access nodes 216 and 226) of clusters 210 and 220. For example, access node 256 may determine the available processing capabilities and available storage capabilities of the clusters 210 and 220. Access node 256 also may determine the available link bandwidth of the clusters 210 and 220, either from the advertisements received from the cluster representatives, or from its knowledge of the link bandwidth of the communications links connecting access node 256 to access nodes 216 and 226, or from any appropriate combination thereof. In addition, access node 256 may determine, from the received cluster advertisements, the switching fabric bandwidth available in clusters 210 and 220, e.g., switching speeds of the access nodes 216 and 226 respectively. Access node 256 combines the capabilities of clusters 210 and 220 to generate the aggregate capabilities of cluster 250, e.g., total processing capability of cluster 250, which is the aggregate of the individual processing capabilities of the clusters 210 and 220.

Access node 256 then advertises the capabilities of cluster 250 to higher-level access nodes in the virtual data center network hierarchy, e.g., access node 256 sends the advertisements for cluster 250 to access node 270, which is the highest level node in the hierarchy of the system 200. The advertised capabilities of cluster 250 may include, among other features, the total available processing capability of cluster 250, total available storage and switching fabric bandwidth of cluster 250. The switching fabric bandwidth of cluster 250 may be determined based on the speed of the switching fabric of access node 256, or it may be an aggregate of the switching speeds of access nodes 256, 216 and 226, or any appropriate combination thereof.

As described previously, the highest level node in the hierarchy of virtual data center network may act as the controller node for the system. However, in some other implementations, a different device in the virtual data center may be the controller, e.g., the vDC gateway 280. In yet other implementations, the functionality of the controller may be distributed among multiple devices in the virtual data center, e.g., the access nodes 270, 256 and 266 may share the controller functions. The controller node receives the resource cluster advertisements from cluster representatives of the resource clusters in the network.

The controller receives one or more service requests (416). For example, access node 270, implementing the role of the controller for the cluster hierarchy in system 200, receives service requests from vDC gateway 280. As described previously, the service requests are sent by one or more data centers (e.g., the data center 110) and received at the virtual data center by a gateway router acting as the point of entry for the virtual data center (e.g., vDC gateway 280), which forwards the service requests to the controller. A service request may include information on one or more resources that are requested by the data center originating the service request.

Based on the information on resource requests included with the service request, the controller groups the resource requests into one or more request clusters (418). For example, access node 270 may receive service request 310 and group the resource requests included with service request 310 into request clusters 312, 314 and 316. The request clusters may be linked to one another based on the aggregate bandwidth of the connection between them. As described previously, a request cluster may be a grouping of resources that share some similar features and together perform one or more operations, e.g., a virtual machine.

After the resource requests are grouped into request clusters, the controller identifies resource clusters that can accommodate the request clusters (420). The request clusters may have constraints associated with them; the controller identifies resource clusters that can satisfy the constraints. For example, the request clusters may have bandwidth constraints, i.e., a link connecting the virtual machines implementing a pair of request clusters may require a minimum available bandwidth. This may be the case, for example, when one or more request clusters are communication-intensive, e.g., the request clusters are to be utilized for streaming video. The controller may identify resource clusters whose advertised CIR is greater than the minimum available bandwidth required by the resource clusters, and therefore can satisfy the bandwidth constraints. The resource clusters also may be required to satisfy policy constraints. For example, a policy enforced in the virtual data center may specify that a resource, which is already operating at or over a predetermined threshold percentage (e.g., 80%) of its processing capability, should not be allocated new operations. The controller may identify resource clusters with resources whose current workload are at or near the threshold percentage of advertised processing capability, and exclude such heavily loaded resource clusters from consideration for accommodating the new request clusters.

Once a subset of resource clusters is identified as candidates for accommodating the request clusters, the controller maps the request clusters to the identified resource clusters (422) to determine the resource clusters that are a good match for the request clusters. The controller computes the total flow (e.g., link bandwidth), both incoming and outgoing, for each top-level cluster, based on its knowledge of the link bandwidths or the cluster advertisements, or any appropriate combination thereof. The controller also computes the total bandwidth requirement for each request cluster. The controller creates a compatibility matrix with the resource clusters being the rows of the matrix and the request clusters being the columns of the matrix. The controller populates a cell of the matrix with the value 1 if the corresponding resource cluster (identified by the row associated with the cell) can accommodate the corresponding request cluster (identified by the column associated with the cell), and a value 0 otherwise. The controller may determine whether a resource cluster can accommodate a request cluster based on one or more constraints being satisfied. For example, a constraint may be that the total bandwidth required by the request cluster should be less than the available bandwidth of the resource cluster. An alternative or additional constraint may be that the number of virtual machines in the request cluster should be less than the number of virtual machines available in the resource cluster. Other constraints based on some other criterion, e.g., available processing capability or available memory, may be used.

Based on the compatibility matrix, the controller determines which of the possible combinations of the resource clusters are feasible for accommodating the request clusters. The controller computes the total bandwidth required for each link between a pair of request clusters. For each possible combination of resource clusters, the controller determines whether the available link bandwidth between a pair of resources mapping to a pair of request clusters is less than the total bandwidth required for the pair of request clusters. If the available link bandwidth is determined to be less, the controller discards the possible combination from consideration for resource allocation.

For a feasible combination of resource clusters, the controller computes a predetermined metric that may be specified by policies enforced in the virtual data center, e.g., specified by the service provider managing the virtual data center. For example, the metric may be maximum link utilization of the links connecting the resource clusters of the feasible allocation. The controller compares the metric for all the feasible combinations of resource clusters, and selects a combination of resource clusters that minimizes the metric. The controller maps each request cluster to a resource cluster in the selected combination of resource clusters.

Subsequently, the controller allocates each request cluster to a resource cluster in the selected combination of resource clusters based on the mapping (424). In some implementations, the controller may know the identifications of the access nodes and resources in the selected resource clusters. The controller may then directly allocate the request clusters to the resources in the mapped resources clusters. In some other implementations, the controller may know only the identification of the cluster representatives of the selected resource clusters. In such implementations, the controller forwards a request cluster to the cluster representative of the corresponding resource cluster based on the mapping. The cluster representative allocates the request cluster to one or more resources within its resource cluster.

The disclosed and other examples can be implemented as one or more computer program products, i.e., one or more modules of computer program instructions encoded on a computer readable medium for execution by, or to control the operation of, data processing apparatus. The implementations can include single or distributed processing of algorithms. The computer readable medium can be a machine-readable storage device, a machine-readable storage substrate, a memory device, or a combination of one or more them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, and it can be deployed in any form, including as a standalone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this document can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer can include a processor for performing instructions and one or more memory devices for storing instructions and data. Generally, a computer can also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data can include all forms of nonvolatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

While this document describe many specifics, these should not be construed as limitations on the scope of an invention that is claimed or of what is claimed, but rather as descriptions of features specific to particular embodiments. Certain features that are described in this document in the context of separate embodiments can also be implemented in combination in a single embodiment. Conversely, various features that are described in the context of a single embodiment can also be implemented in multiple embodiments separately or in any suitable sub-combination. Moreover, although features is described above as acting in certain combinations and even initially claimed as such, one or more features from a claimed combination can in some cases be excised from the combination, and the claimed combination is directed to a sub-combination or a variation of a sub-combination. Similarly, while operations are depicted in the drawings in a particular order, this should not be understood as requiring that such operations be performed in the particular order shown or in sequential order, or that all illustrated operations be performed, to achieve desirable results.

Only a few examples and implementations are disclosed. Variations, modifications, and enhancements to the described examples and implementations and other implementations can be made based on what is disclosed.

What is claimed is:

1. A method comprising:
   determining, at a first network device, capabilities of resources in a section of a data center that is accessible by the first network device, wherein the first network device is one of a plurality of network devices providing access to resources in different sections of the data center and the first network device is directly connected to the resources the first network device is determining the capabilities of, wherein the capabilities include at least one of available processing capabilities, available storage, available load balancing capabilities or any combination thereof;
   based on determining the capabilities of the resources, grouping, by a processor on the first network device, the resources into a resource cluster, wherein a resource cluster is a grouping of resources with similar features in the data center;
   advertising, at the first network device, the resource cluster in the data center, wherein each of the plurality of network devices advertise a resource cluster associated with one or more of the different sections of the data center that are accessible using each of the plurality of network devices, wherein a second network device is configured to:
      receive advertisements from a plurality of devices, wherein an advertisement includes information on a resource cluster,
      receive a request for providing a service, the request including information related to a resource requirement for providing the service,
      group, based on the information related to the resource requirement for providing the service, the request with at least one request cluster of a plurality of request clusters,
      select, based on information associated with the request clusters and the advertised resource clusters, at least one resource cluster for providing the service, and
      based on selecting at least one resource cluster for providing the service, allocate, using the second network device, resources included in the at least one resource cluster for providing the service.

2. The method of claim 1, wherein a resource is selected from a group including a computer, a server, a virtual machine (VM) running on a server, a switch and a router.

3. The method of claim 1, the method further comprising grouping the resources into a plurality of resource clusters using clustering, based on
   determining within a pre-determined time interval, a similarity metric for each pair of resources associated with the section of the data center that is accessible using the first network device,
   selecting resources with values of the similarity metric that are higher than a pre-determined threshold,
   including the selected resources in a resource cluster, and for remaining resources that are not selected, determining the similarity metric for each pair of resources, selecting resources with values of the similarity metric that are higher than a pre-determined threshold, and including the selected resources in the resource cluster until the pre-determined time interval is expired.

4. The method of claim 3, wherein the similarity metric is associated with a weighted Euclidean distance, wherein the Euclidean distance is based on at least one feature selected from a group including bandwidth, central processing unit (CPU) speed and memory, and wherein weights used in determining the Euclidean distance are based on a policy of resource allocation.

5. The method of claim 3, wherein the similarity metric is associated with an expression based on at least one feature selected from a group including bandwidth, CPU speed and memory, wherein an evaluation of the expression results in a binary value.

6. The method of claim 1, wherein a request cluster includes a grouping of one or more components of the service.

7. The method of claim 1, wherein a request cluster includes a virtual machine (VM).

8. The method of claim 1, wherein the service includes a data center (DC) service.

9. The method of claim 1, wherein a number of the resource clusters selected for providing the service is at most same as a number of request clusters.

10. The method of claim 1, wherein selecting, by the second network device and based on information associated with the request clusters and the advertised resource clusters, at least one resource cluster for providing the service further includes:
   determining, using the second network device and based on grouping the request with the at least one request cluster of the plurality of request clusters, requirements of a plurality of parameters for the request clusters;
   analyzing, using the second network device, capabilities of the resource clusters associated with the plurality of parameters;
   based on analyzing the capabilities of the resource clusters, identifying, using the second network device, at least one resource cluster that has capabilities associated with the plurality of parameters similar to the determined requirements of the plurality of parameters for the request clusters; and
   selecting, using the second network device, the at least one identified resource cluster for providing the service.

11. The method of claim 10, wherein analyzing, using the second network device, capabilities associated with plurality of parameters of the resource clusters further comprises:
   removing from consideration for providing the service resource clusters with capabilities associated with the plurality of parameters that are not similar to the requirements of the plurality of parameters for the request clusters.

12. The method of claim 10, wherein the plurality of parameters are selected from a group including virtual machine (VM) features and available bandwidth of a resource cluster.

13. The method of claim 12, wherein the available bandwidth of a resource cluster is based on a committed information rate (CIR) associated with the resource cluster.

14. The method of claim 10, wherein identifying, using the second network device, at least one resource cluster that has capabilities associated with the plurality of parameters similar to the determined requirements of the plurality of parameters for the request clusters further comprises:

computing, using the second network device, a similarity metric between each request cluster and each resource cluster; and for each request cluster, identifying a resource cluster that has a highest value of the similarity metric amongst all resource clusters.

15. The method of claim 14, wherein for a given request cluster, a resource cluster that has the highest value of the similarity metric is the resource cluster that has capabilities associated with the plurality of parameters most similar to the determined requirements of the plurality of parameters for the given request cluster.

16. A non-transitory computer-readable medium storing software comprising instructions executable by one or more processors, which, upon such execution, cause the one or more processors to perform operations comprising:

determining, at a first network device, capabilities of resources in a section of a data center that is accessible using the first network device, wherein the first network device is one of a plurality of network devices providing access to resources in different sections of the data center and the first network device is directly connected to the resources it is determining the capabilities of, wherein the capabilities include at least one of available processing capabilities, available storage, available load balancing capabilities or any combination thereof;

based on determining the capabilities of the resources, grouping, at the first network device, the resources into a resource cluster, wherein a resource cluster is a grouping of resources with similar features in the data center; and advertising, at the first network device, the resource cluster in the network, wherein each of the plurality of network devices advertise a resource cluster associated with one or more of the different sections of the data center that are accessible using each of the plurality of network devices, wherein a second network device is configured to:

receive advertisements from a plurality of devices, wherein an advertisement includes information on a resource cluster, receive a request for providing a service, the request including information related to a resource requirement for providing the service, group, based on the information related to the resource requirement for providing the service, the request with at least one request cluster of a plurality of request clusters, select, based on information associated with the request clusters and the advertised resource clusters, at least one resource cluster for providing the service, and based on selecting at least one resource cluster for providing the service, allocate, using the second network device, resources included in the at least one resource cluster for providing the service.

17. The computer-readable medium of claim 16, wherein the instructions cause the one or more processors to perform operations comprising grouping the resources into a plurality of resource clusters using clustering, based on determining within a pre-determined time interval, a similarity metric for each pair of resources associated with the section of the data center that is accessible using the first network device, selecting resources with values of the similarity metric that are higher than a pre-determined threshold, including the selected resources in a resource cluster, and for remaining resources that are not selected, determining the similarity metric for each pair of resources, selecting resources with values of the similarity metric that are higher than a pre-determined threshold, and including the selected resources in the resource cluster until the pre-determined time interval is expired.

18. The computer-readable medium of claim 16, wherein selecting, using the second network device and based on information associated with the request clusters and the advertised resource clusters, at least one resource cluster for providing the service comprises:

determining, using the second network device and based on grouping the request with the at least one request cluster of the plurality of request clusters, requirements of a plurality of parameters for the request clusters;

analyzing, using the second network device, capabilities of the resource clusters associated with the plurality of parameters;

based on analyzing the capabilities of the resource clusters, identifying, using the second network device, at least one resource cluster that has capabilities associated with the plurality of parameters similar to the determined requirements of the plurality of parameters for the request clusters; and selecting, using the second network device, the at least one identified resource cluster for providing the service.

* * * * *